(12) United States Patent
Pavlin

(10) Patent No.: US 7,207,669 B2
(45) Date of Patent: Apr. 24, 2007

(54) JET PRINTING INKS CONTAINING POLYMERIZED FATTY ACID-BASED POLYAMIDES

(75) Inventor: Mark S. Pavlin, Savannah, GA (US)

(73) Assignee: Arizona Chemical Company, Jacksonville, FL (US)

( * ) Notice: Subject to any disclaimer, the term of this patent is extended or adjusted under 35 U.S.C. 154(b) by 16 days.

(21) Appl. No.: 10/742,121

(22) Filed: Dec. 19, 2003

(65) Prior Publication Data

US 2005/0134664 A1   Jun. 23, 2005

(51) Int. Cl.
*B41J 11/00* (2006.01)
(52) U.S. Cl. .................................................. 347/100
(58) Field of Classification Search ............ 347/100
See application file for complete search history.

(56) References Cited

U.S. PATENT DOCUMENTS

| | | |
|---|---|---|
| 3,253,940 A | 5/1966 | Floyd et al. |
| 3,622,604 A | 11/1971 | Drawert et al. |
| 3,700,618 A | 10/1972 | Sharkey et al. |
| 4,142,905 A | 3/1979 | Cooke |
| 4,207,577 A | 6/1980 | Mansukhani |
| 4,508,868 A | 4/1985 | Whyzmuzis et al. |
| 5,006,170 A * | 4/1991 | Schwarz et al. ............ 106/31.3 |
| 5,104,448 A | 4/1992 | Kruse |
| 5,109,054 A * | 4/1992 | Smith .......................... 524/514 |
| 5,112,398 A | 5/1992 | Kruse |
| 5,154,761 A | 10/1992 | Cooke et al. |
| 5,194,638 A * | 3/1993 | Frihart et al. ................. 554/47 |
| 5,302,631 A * | 4/1994 | Yamada et al. ............. 523/160 |
| 5,407,985 A | 4/1995 | Smith |
| 5,500,209 A | 3/1996 | Mendolia et al. |
| 5,594,044 A | 1/1997 | Yang |
| 5,663,217 A | 9/1997 | Kruse |
| 5,843,219 A | 12/1998 | Griffin et al. |
| 5,888,287 A | 3/1999 | Brown et al. |
| 5,936,027 A | 8/1999 | Zahrobsky et al. |
| 5,958,122 A | 9/1999 | Fukuda et al. |
| 5,990,197 A | 11/1999 | Escano et al. |
| 5,998,502 A | 12/1999 | Burr et al. |
| 6,000,793 A | 12/1999 | Inamoto |
| 6,010,564 A | 1/2000 | Zhu et al. |
| 6,113,679 A * | 9/2000 | Adkins et al. ............. 106/31.6 |
| 6,148,165 A * | 11/2000 | Visser et al. ................ 399/223 |
| 6,328,393 B1 * | 12/2001 | Lin et al. ......................... 347/1 |
| 6,767,394 B2 * | 7/2004 | Shawcross et al. ...... 106/31.48 |
| 2004/0226476 A1 * | 11/2004 | Bedford et al. .......... 106/31.29 |

* cited by examiner

*Primary Examiner*—Manish S. Shah
*Assistant Examiner*—Laura E. Martin
(74) *Attorney, Agent, or Firm*—Joseph W. Segers, III; J.M. (Mark) Gilbreth

(57) ABSTRACT

The present invention relates to a printing ink composition containing a colorant, resin and solvent, where the resin is a polymerized fatty acid-based polyamide resin and the solvent is made up of at least one first solvent and at least one second solvent, as well as methods of making and using the same.

47 Claims, No Drawings

JET PRINTING INKS CONTAINING POLYMERIZED FATTY ACID-BASED POLYAMIDES

BACKGROUND OF THE INVENTION

1. Field of the Invention

This invention relates to jet printing inks, and to the use of polymerized fatty acid-based polyamide resins therein.

2. Description of the Related Art

There is a growing market for all manner of posters, advertising displays, banners, and the like printed by digital methods. One of these, impulse printing, also called drop-on-demand (DOD) inkjet printing, with low-volatility organic solvent-based ink is presently used by digital imaging equipment sold by Oce, Gretag, NUR and others to produce images with better color, adhesion, and abrasion-resistance than those images produced with water-based inks. Inkjet printing is performed by discharging ink droplets from a print head to a substrate. The droplets are ejected through orifices or nozzles in the faceplate of the print head and are directed to the substrate to form an image thereon. In contrast to many other types of printing, there is no contact between the printer and the substrate in inkjet techniques.

Most of the inkjet printers known in the art may be characterized as either continuous or impulse devices, depending upon the mechanism by which the ink droplets are directed to the substrate. In continuous inkjet systems, an essentially uninterrupted stream of ink is ejected from a nozzle and breaks up into droplets. The droplets bear an electric charge so that they can be deflected by an applied electric field which is modulated according to the particular image to be recorded. The electric field directs the droplets toward either the substrate or an ink re-circulating reservoir. The inks employed in conjunction with continuous inkjet systems typically comprise a colorant such as a dye or pigment, an electrolyte to facilitate droplet deflection, and a liquid vehicle to dissolve or disperse the colorant and the electrolyte. While the vehicle in many continuous-type inks comprises water, U.S. Pat. No. 4,142,905, in the name of Cooke, disclosed a water-free ink composition consisting essentially of a low molecular weight glycol, an inorganic salt electrolyte, and a dye which is soluble in the glycol.

With so-called "impulse" or "drop-on-demand" inkjet printers, image formation is controlled by selectively energizing and de-energizing a piezoelectric transducer rather than by modulating an applied electric field. Ink is stored in the print head or nozzle until it is necessary to form an image on the substrate. The printer is then activated to apply pressure to the ink and discharge a selected number of discrete ink droplets toward the substrate. These ink droplets need not, and typically do not bear an electric charge. Accordingly, impulse ink compositions are free of corrosive substances such as water and electrolytes which continuous stream inks often contain.

However, DOD inkjet printers present a number of problems that are not encountered in continuous inkjet (CIJ) systems. For example, unlike CIJ printers, impulse printers typically are maintained in a stand-by or temporarily inoperative mode between printing cycles. Thus, the ink is allowed to stand and possibly solidify in the discharge orifices of the print head. Impulse printers normally begin a printing cycle with such material in place. Many of the start-up problems encountered with impulse printers are attributable to ink which has been allowed to stand in the discharge orifices during stand-by periods. Such material is less of a concern in continuous systems because there typically are fewer interruptions in the flow of ink. Even where ink is allowed to stand and solidify, it is more easily purged due to the considerably higher pressures at which CIJ printers operate. Accordingly, DOD inks must be specially formulated to minimize start-up problems.

Although numerous ink compositions for DOD inkjet printers are known in the art, many of these inks are not suitable for writing on non-porous substrate other than vinyl. Some lack adhesion to polyolefin films, and some are hygroscopic leading to poor wetting and drying. To improve the adhesion of an ink requires use of an improved binder for the colorant in the ink or use of more (by weight) of more of a conventional binder. Yet to improve the economics of DOD printing, jobs must be printed faster which in turn requires inks that dry faster than many of the inks described in the prior art. Employment of a rapidly evaporating ink solvent is not necessarily the answer. Rapid evaporation of the vehicle of a volatile ink often leads to clogging of discharge orifices because the last portion of the ink ejected from an orifice collapses back onto the faceplate while the rest of the ink droplet breaks away and flies to the substrate. If the ink that falls on the faceplate dries before it can flow back into the orifice, a pile of binder resin and colorant will form at the edges of the orifice, gradually changing the way drops are discharged and even causing the orifice to clog entirely. Rapid evaporation of the vehicle can also clog the orifice during stand-by periods since the ink forms a meniscus at the air-ink interface and can, as solvent is released to the air, harden. These problems are aggravated when the ink formulator attempts to increase the binder content to improve adhesion of the ink on the substrate. Moreover, rapid evaporation is undesired due to the adverse environmental and health effects of many commonly employed ink vehicles. Finally, if the flash point of the ink is too low, generally below about 61° C., it cannot be shipped by air.

Printing inks for flexographic printing on non-porous substrates such as polyethylene and polypropylene are well known. Those formulated with a pigment, a fast-evaporating organic solvent and a resinous binder represent the state-of-the-art in packaging printing, allowing printing of high quality full-color images having excellent adhesion and abrasion-resistance even when the package is stored in a freezer for extended periods of time.

The organic solvent in these inks is typically a blend rich in a lower alcohol, for example, ethanol, propanol, or isopropanol, since these alcohols are good solvents for the resinous binder and evaporate rapidly after printing. Flexographic inks may also contain lesser amounts of a lower aliphatic ester, such as ethyl acetate and propyl acetate, and an aromatic solvent such as toluene. A common resin is the reaction product of a polymerized fatty acid (also referred to as dimer acid), a diamine or mixture of diamines, and a terminating monocarboxylic acid. These polymerized fatty acid-based polyamide resins suitable for use in flexographic inks are well known and described in detail in numerous patents as are methods for preparing the inks (e.g., U.S. Pat. Nos. 3,253,940, 3,622,604, 3,700,618, and 4,508,868). These patents make clear that polymerized fatty acid-based polyamides tend to form gels when dissolved in lower aliphatic alcohols. Indeed, a large proportion of the issued patents state that they are directed to resin compositions with improved solution storage stability. Because of these largely successful developments, the stability of commercial flexographic inks is not currently a problem. Nevertheless, no general theory to explain solution stability has been developed; that is, resins are developed empirically and test results for ethanol and propanol cannot be extended to other solvents.

These same patents do not discuss the need for a new kind of ink suitable for use in drop-on-demand (DOD) inkjet printers. DOD jet inks must employ a solvent with a much slower evaporation rate than the lower alcohols so that the nozzle of the printer does not clog. The inks must also have a much higher flash point than the lower alcohols so they can be transported by air and used in an office or small print shop environment safely.

There is also an extensive prior art disclosing the preparation of jet inks. A large proportion of said art teaches inks suitable for use in so-called thermal inkjet printers. These inks are largely water-based and contain no resin. Of the non-aqueous inkjet patents, a large proportion relate to so-called "continuous inkjet" or CIJ inks. These inks are based on low flash point, high volatility solvents such as methanol, acetone, ethanol, propanol, ethyl acetate, and methyl ethyl ketone. These inks have been tried in DOD printers but are detrimental to them since they dry rapidly and tend to clog the heads.

U.S. Pat. No. 4,207,577 (1980) discloses a CIJ ink composition that necessarily includes a cellulosic resin, an optional co-resin, a colorant, and at least one solvent. The necessary cellulosic component can be cellulose derivatives such as cellulose esters (nitrocellulose, cellulose acetate and the like), and especially cellulose ethers, for example, methylcellulose, hydroxyethylcellulose, hydroxypropylcellulose, propionitrile cellulose, ethyl cellulose, and benzylcellulose. This patent is one of the earliest patents describing a solvent inkjet ink.

U.S. Pat. No. 5,104,448 (1992) discloses low volatility and low viscosity jet printing inks consisting essentially of a dye (or pigment) and an optional binder, dissolved (or dispersed) in a polyhydric alcohol ether solvent (such as polypropylene glycol monoalkyl ether, ethylene glycol butyl ether, diethylene glycol butyl ether, etc.). This patent mentions that the disclosed ink composition is suitable for DOD printing.

U.S. Pat. No. 5,154,761 (1992) discloses DOD-type inkjet inks which produce well-defined images on porous substrates such as Kraft paper and corrugated cardboard. These ink compositions comprise from 65–80% of a low molecular weight diol, from about 15–25% of a low molecular weight diol-ether, and from about 1–15% of a colorant. Said inks contain no resin and are not suitable for printing on non-porous substrates.

U.S. Pat. No. 5,594,044 (1997) discloses a jet ink composition suitable for printing images which have good adhesion and isopropyl alcohol rub resistance, comprising an organic solvent, a urethane resin, a colorant, a cellulose nitrate resin, and an adhesion promoter such as a titanate. Organic solvents suitable for the ink composition of the invention include ketones, esters, $C_{1-6}$ alcohols, hydrocarbons, glycols, and glycol ethers.

U.S. Pat. No. 5,663,217 (1997) discloses formulation of a jet ink which comprises a suspension in a non-aqueous solvent of a disperse phase containing an insoluble colorant, a resinous dispersant for the colorant, and a polymer binder wherein said solvent is a polyhydric alcohol ether. A new component disclosed in this patent is the resinous dispersant, selected to be capable of forming a solution in the chosen solvent and to disperse the dyestuff in the solvent so as to form a substantially stable dispersion.

U.S. Pat. No. 5,843,219 (1998) discloses inks based on petroleum distillates. Said inks are stable dispersions comprising pigment, diluent, and a dispersant for stabilizing the pigment in the medium, wherein the major component of the diluent is a hydrocarbon while the minor component is a polar component selected from alcohols, glycols, polyglycols, ethers of glycols and polyglycols, alkoxylated alkyl phenols and admixtures thereof.

U.S. Pat. No. 5,888,287 (1999) discloses an inkjet composition having a reduced tendency to smear upon application to a substrate. The ink composition contains no resin and is free of monohydric alcohol solvent.

U.S. Pat. No. 5,936,027 (1999) discloses a jet ink containing a colorant; a non-aqueous solvent comprising alcohol and ketone, either alone or in admixture; and resin comprising ethyl cellulose, phenolic resin, and silicone resin. While perhaps suitable for the CIJ printing method, these inks are likely too volatile for use in DOD devices.

U.S. Pat. No. 5,990,197 (1999) discloses an organic solvent-based polyester ink formulation containing a fluorescing compound, suitable for inkjet printing applications. The ink formulation comprises at least one organic soluble polyester having at least one near-infrared fluorophore copolymerized therein; an organic solvent selected from $C_{3-6}$ ketones, $C_{3-6}$ organic esters, $C_{1-3}$ alcohols, and combinations thereof; and 1–5 wt % of a binder selected from cellulose ester, condensed phenolic resin, polyketone, polyamide and polyurethane resin and an organic solvent soluble electrolyte.

U.S. Pat. No. 5,958,122 (1999) discloses a printing apparatus in which metered amounts of an ink and a diluting solution (comprising water and at least one water-soluble or water-insoluble organic component) are mixed and the resulting mixed liquid is ejected to a recording medium for jet printing. The water-soluble organic solvent is desirably selected from aliphatic monohydric alcohol, polyhydric alcohol or its derivatives, including lower alcohols, alcohol amines, ketones, amides, ethers, alkylene glycols, polyalkylene glycols, lower alkyl ethers of polyhydric alcohols, and glycerin.

U.S. Pat. No. 5,998,502 (1999) discloses resinous binders suitable for use in CIJ printers which are polyamides soluble in ethanol and having a glass transition temperature of at least 95° C. Because ethanol-based inks are too volatile for use in DOD devices, it is entirely uncertain whether such binders would be soluble in a solvent appropriate for use in a DOD printer.

U.S. Pat. No. 6,010,564 (2000) discloses a jet ink composition suitable for printing images on substrates such as plastics, said composition comprising an organic solvent, a colorant, a cellulose nitrate resin, and a rosin resin. The organic solvent may comprise one or more organic components, selected from ketones, esters, and $C_{1-6}$ alcohols. While suitable for the CIJ printing method, these inks are likely too volatile for use in DOD devices.

The present invention is directed to overcoming these problems associated with jet inks, providing jet inks particularly suitable for use in DOD printers, and related compositions and methods as described in further detail below.

BRIEF SUMMARY OF THE INVENTION

Interest is being shown by equipment manufacturers in devices to print on polyolefin packaging and plastic-coated boards or plastic sheets. All of these emerging applications require an ink having good adhesion to these non-porous substrates in addition to fast drying, excellent color development and low, stable viscosity. In one aspect, the present invention provides inks suitable for this application, and methods of printing with these inks.

In another aspect, the present invention relates to organic solvent-based ink formulations suitable for inkjet printing by the piezoelectric impulse drop-on-demand (DOD) method, said formulations comprising a polymerized fatty acid polyamide resin and a suitable solvent. DOD printers place severe restrictions on their inks, where these inks must have relatively low viscosity (about 10–20 centipoise (cps) at the printer's operating temperature) and moderate volatility (evaporation rate of about 2% that of n-butyl acetate). Currently available DOD inks are based on polymeric resins such as poly(vinyl acetate), and solvents such as dipropylene glycol methyl ether. The high molecular weight of these polymeric resins limits the amount that can be added to an ink. Thus, another aspect of the present invention is to provide a resin with a very low molecular weight in order that a much higher resin loading can be attained in the ink. This provides faster drying inks with improved color development, color permanence, and abrasion resistance.

Polymerized fatty acid-based polyamide resins are known from their use in flexographic printing inks to provide excellent performance properties even on polyolefin substrates. However, these resins, though commercially available in a number of grades from Arizona Chemical and other graphic arts industry suppliers, have not been used in making digital DOD inks, due in large part because these resins are not soluble in the glycol ethers typically used as solvents in commercial DOD jet inks. Nor are they soluble in co-solvents used in DOD inks such as cyclohexanone, ethyl lactate, and ethyl ethoxypropionate, although some dissolve in cyclohexanone but form a gel upon cooling.

Therefore, another aspect of this invention is to provide a preparation for inks comprising polymerized fatty acid-based polyamide and a solvent which possess physical properties (such as flash point and evaporation rate) suitable for use in drop-on-demand printing applications. Surprisingly, 1-hexanol, N-methylpyrrolidinone, and similar aliphatic alcohols and amides have been discovered to be excellent solvents in this regard.

Another aspect of the present invention provides a method of printing, comprising (a) charging a printhead of an ink-jet printer with ink, the ink being a fluid mixture comprising polymerized fatty acid-based polyamide resin, organic solvent and colorant, wherein the solvent comprises a first solvent and a second solvent, where the first solvent is one or a mixture selected from solvents comprising a single amide, single carbamide, or single hydroxyl group as the only non-hydrocarbon moiety in the solvent; and the second solvent is a hydrocarbon or hydrocarbon mixture; and (b) transferring the ink from the printhead onto a substrate. In a preferred embodiment, the printer is a drop-on-demand printer.

Another aspect of the present invention provides a printing ink composition comprising colorant, resin and solvent, where the resin is a polymerized fatty acid-based polyamide resin, the solvent comprises a first solvent and a second solvent wherein the first solvent is one or a mixture selected from solvents having a single amide or carbamide group as the only non-hydrocarbon moiety in the solvent; and the second solvent is a hydrocarbon or hydrocarbon mixture. In a further aspect, the first solvent has a total of 5 to 11 atoms selected form carbon, nitrogen, and oxygen; in a separate further aspect, the second solvent is a terpene hydrocarbon. In other optional aspects, the organic solvent further comprises a third solvent selected from α-hydroxy-carboxylic ester, polyalkylene glycol alkyl ether, and ketone-containing solvents; the resin comprises 5–40 wt % of the total weight of resin and solvent; and/or the ink composition has a viscosity of less than 25 cps at one or more temperatures between 25° C. and 60° C.

Yet another aspect of the present invention provides a printing ink composition comprising colorant, resin and solvent, where the resin is a polymerized fatty acid-based polyamide resin, the solvent comprises a first solvent and a second solvent, where the first solvent is one or a mixture selected from solvents having a single hydroxyl group as the only non-hydrocarbon moiety in the solvent; and the second solvent is a hydrocarbon or hydrocarbon mixture. In a further aspect, the first solvent has a total of 5 to 11 atoms selected form carbon and oxygen; in a separate further aspect, the second solvent is selected from mineral spirits and fractions thereof. In other optional aspects, the organic solvent further comprises a third solvent selected from α-hydroxy-carboxylic ester, polyalkylene glycol alkyl ether, and ketone-containing solvents; the resin comprises 5–40 wt % of the total weight of resin and solvent; and/or said ink composition has a viscosity of less than 25 cps at one or more temperatures between 25° C. and 60° C.

These and other aspects of the present invention are discussed in further detail below.

DETAILED DESCRIPTION OF THE INVENTION

One aspect of the present invention provides a method of printing, comprising (a) charging a printhead of an ink-jet printer with ink, the ink being a fluid mixture comprising polymerized fatty acid-based polyamide resin, organic solvent and colorant, wherein the solvent comprises a first solvent and a second solvent, where the first solvent is one or a mixture selected from solvents comprising a single amide, single carbamide, or single hydroxyl group, and the second solvent is a hydrocarbon or hydrocarbon mixture; and (b) transferring the ink from the printhead onto a substrate. Preferably, the printer of the present invention is a drop-on-demand (DOD) printer.

As used herein, an amide group is a monovalent radical of the structure —C(O)—N($R^1$)($R^2$), or a divalent radical of the structure —C(O)—N($R^1$)—, wherein $R^1$ and $R^2$ are independently selected from hydrogen and optionally-substituted hydrocarbyl radical. A carbamide group is a monovalent radical of the structure —N($R^1$)—C(O)—N($R^2$)($R^3$), or a divalent radical of the structure —N($R^1$)—C(O)—N($R^2$)—, wherein $R^1$, $R^2$ and $R^3$ are independently selected from hydrogen and optionally-substituted hydrocarbyl radical. An hydroxyl group is a monovalent radical of the structure —OH. "Hydrocarbyl" refers to a hydrocarbon moiety of a molecule, i.e., a moiety composed entirely of carbon and hydrogen atoms.

As used herein, a fatty acid-based polyamide resin is a polyamide resin having the structure that results when reactants including diacid and diamine are reacted together to form molecules containing a plurality of amide groups, where the diacid includes polymerized fatty acid, and preferably includes dimer acid resulting from the polymerization of tall oil fatty acid.

While is it known to those experienced in the art that polymerized fatty acid-based polyamides are used as resins (or binders) in flexographic printing inks containing lower alcohols (i.e., $C_{1-5}$ alcohols, referring to alcohols containing 1 to 5 carbon atoms in their molecular structures) as diluents, polyamide resins have thus far been largely avoided in making digital DOD inks. This may be because these polyamide resins do not form fluid, clear, stable, and Newtonian solutions in the glycol ethers, ketones, hydrocarbons, and esters preferred for use in DOD printing inks. Although lower alcohols such as ethanol and isopropanol are widely used to formulate CIJ inks, these solvents dry too quickly (and thus clog the ink channels) to be useful in DOD printing devices. It is therefore surprising that stable, high-performance DOD inks can be formulated using polymerized fatty acid polyamides.

The polymerized fatty acid-based polyamides used in the ink composition of the present invention are preferably and typically clear, amorphous (resinous) solids having a softening point of at least 70° C. and a weight-average molecular weight of 2,000 to 10,000. They are well-known and result from the reaction of a diacid and a diamine, where at least some of the diacid is difunctional polymerized fatty acid, also known as dimer acid. Suitable dimer acids that are commercially available include UNIDYME™ 18 dimer acid (Arizona Chemical, Jacksonville, Fla.), EMPOL®1019 dimer acid (Cognis Corporation), or PRIPOL™1013 dimer acid (Uniqema Chemical Inc., New Castle, Del.). Suitable diamines include, without limitation, ethylene diamine, diethylene triamine, piperazine, 1,2-diaminocyclohexane, trimethylhexamethylene diamine, isophorone diamine, 2-methylpentamethylene diamine (DYTEK™ A, DuPont, Wilmington, Del.) and/or hexamethylene diamine. Optionally, the reactant composition used to form the polyamide may contain a terminating monocarboxylic acid such as (without limitation) acetic acid, propionic acid, isobutyric acid, 2-ethylhexanoic acid, fatty acid monomer, or tall oil fatty acids. Fatty acid monomers may be saturated, monounsaturated, or polyunsaturated in the hydrocarbon portion of the structure.

As used herein, a saturated fatty acid is one wherein no neighboring carbon atoms are double-bonded to each other, while a monounsaturated fatty acid is one wherein one set of neighboring carbon atoms is double-bonded together, and a polyunsaturated fatty acid is one wherein more than one set of neighboring carbon atoms are double-bonded, and wherein no carbon atom is double-bonded to more than one other atom. Exemplary saturated fatty acids are (without limitation) valeric, caproic, caprylic, lauric, myristic, palmitic, stearic, arachidic, behenic, lignoceric, cerotic, and montanic acids; exemplary monounsaturated fatty acids are (without limitation) caproleic, palmitoleic, oleic, vaccenic, eladic, brassidic, erucic, and nervonic acids; and exemplary polyunsaturated fatty acids are (without limitation) linoleic, linolenic, eleostearic, and arachidonic acids.

Preparative details for polyamides of this invention are disclosed by Floyd and Glaser in U.S. Pat. No. 3,253,940, Sharkey and Sturwold in U.S. Pat. No. 3,700,618, Smith in U.S. Pat. No. 5,407,985, and Ross et al. in U.S. Pat. No. 5,500,209, among many others. In one aspect of the ink composition of the present invention, the polyamide is the reaction product of reactants comprising polymerized fatty acid, ethylene diamine, hexamethylene diamine, and fatty acid monomer. Illustrative of polyamides of this invention are the UNI-REZ® 2000-series polyamide ink resins (Arizona Chemical, Jacksonville, Fla.). Preferred polyamides are those having a softening point of at least 90° C. and greater than 20% termination by the monocarboxylic acid on an equivalents basis, expressed as $$\% \text{ termination} = 100\% \times \frac{\text{monocarboxylic acid equivalents}}{\text{total carboxylic acid equivalents}} \quad (1)$$

Most preferred are, UNI-REZ® 2221, UNI-REZ® 2224, UNI-REZ® 2215, UNI-REZ® 2226, UNI-REZ® 2228, and UNI-REZ® 2229 polyamides. Preferably the resin comprises 5–40 wt % of the total weight of resin and solvent in the printing ink of the present invention; more preferably the resin comprises 10–35 wt % of the total weight of resin and solvent in the ink; still more preferably the resin comprises 15–30 wt % of the total weight of resin and solvent in the ink.

The liquid vehicle of the ink of the present invention consists of a solution of the selected polyamide dissolved or dispersed in a solvent which, considered separately from the polyamide and the colorant, consists of two liquid components, designated the first solvent and the second solvent. These solvents are preferably organic compounds (i.e., compounds containing at least one carbon atom in their molecular structures). The solvents are preferably non-aqueous, i.e., there is no water in the ink composition of the present invention.

The first solvent, comprising at least 20% by weight of the total solvent of the composition (considered separately from the polyamide and the colorant) is preferably selected from solvents comprising a single amide, single carbamide, or single hydroxyl group as the only non-hydrocarbon moiety in the solvent Exemplary first solvents include (without limitation) liquid aliphatic alcohols, liquid aliphatic amides, aliphatic carbamides, and mixtures thereof. These solvent components each preferably have a total of from 5 to 11 atoms of carbon, nitrogen, and oxygen. The first solvent components may be linear, cyclic, or branched in molecular structure.

Preferably, the first solvent components are selected from the group consisting of aliphatic alcohol, aliphatic amide, and polyalkyl carbamide. Illustrative of these are (without limitation) cyclohexanol, 1-hexanol, 2-hexanol, 3-hexanol, cis-2-hexen-1-ol, trans-2-hexen-1-ol, cycloheptanol, 1-heptanol, 2-heptanol, 2-ethyl-1-hexanol, 1-octanol, 1-nonanol, 3,5,5-trimethyl-1-hexanol, 1-decanol, α-terpineol, and 3,7-dimethyl-3-octanol (tetrahydrolinalool) as exemplary aliphatic alcohols; N,N-dimethylformamide (DMF), N-methylpyrrolidinone, and N,N-dimethylacetamide as exemplary aliphatic amides; and dimethylurea, trimethylurea, and tetramethylurea as exemplary polyalkyl carbamides. Preferred are N,N-dimethylformamide (DMF), N-methylpyrrolidinone, N,N-dimethylacetamide, and linear or branched six- to ten-carbon (i.e., $C_{6-10}$) aliphatic alcohols having a flash point greater than about 45° C. and a viscosity at 25° C. of less than 25 cps. Preferably the first solvent is selected from 1-hexanol, 1-heptanol, 3,5,5-trimethyl-1-hexanol, 2-ethyl-1-hexanol, 1-octanol, N,N-dimethylformamide, N-methylpyrrolidinone, N,N-dimethylacetamide, tetramethylurea, and mixtures thereof; more preferably the first solvent is selected from 1-hexanol, 1-heptanol, 2-ethyl-1-hexanol, 1-octanol, N,N-dimethylformamide, N-methylpyrrolidinone, N,N-dimethylacetamide, tetramethylurea, and mixtures thereof; still more preferably the first solvent is selected from 1-hexanol and N-methylpyrrolidinone.

As used herein, the term "aliphatic" refers to a hydrocarbon molecule or hydrocarbon moiety of a molecule that is not aromatic in structure. "Alkyl" refers to a hydrocarbon moiety of a molecule that is completely single-bonded, while the term "polyalkyl" refers to a molecular moiety containing more than one alkyl group. "Polyalkylene" refers to a molecular moiety containing more than one divalent or multivalent alkyl radical. The foregoing moieties may be cyclic, linear, or branched in structure.

1-Hexanol, N-methylpyrrolidinone and similar aliphatic alcohols and amides are preferred compounds for the first solvent in large part because they generally have adequate evaporation rates and flash points, and because they tend to dissolve polyamides resins to provide low-to-moderate viscosity solutions. Many are commercially available at low to moderate cost and have bland (i.e., non-obnoxious) or even pleasant odors. Furthermore, because they are good solvents for polyamides, other solvents can be admixed in the ink without causing the ink to gel or cloud even at the high resin loadings desired. Preferably, the first solvent is at least 20 wt % of the total solvent of the ink composition; more preferably the first solvent is 30–90 wt % of the total solvent of the ink composition; still more preferably the first solvent is 40–80 wt % of the total solvent of the ink composition; even still more preferably the first solvent is 45–75 wt % of the total solvent of the ink composition.

The second solvent, comprising up to 80% by weight of the solvent (considered separately from the polyamide and the colorant), is a liquid that can be used to adjust the ink flash point, viscosity, polyamide solubility and/or drying rate, but must be carefully selected in terms of chemical properties and quanitity so as not to cause the polyamide resin to precipitate from the ink or gel the ink. Selection of the second solvent is therefore very important and is preferably limited to liquids having a flash point greater than about 40° C. and a viscosity at 25° C. of less than 60 cps; more preferably the second solvent has a viscosity at 25° C. of less than 45 cps; even more preferably the second solvent has a viscosity at 25° C. of less than 30 cps; still even more preferably the second solvent has a viscosity at 25° C. of less than 25 cps.

In one aspect, the second solvent is a hydrocarbon. Preferred second solvents are cycloalkanes, fused cycloalkanes, alkenes, and dearomatized mineral spirits. Hydrocarbons that can serve as the second solvent are exemplified by (without limitation) DECALIN™ decahydronaphthalene (DuPont), dearomatized mineral spirits, and terpene hydrocarbons. Terpene hydrocarbons are exemplified by (without limitation) α-pinene, β-pinene, limonene, and terpinolene.

In a preferred aspect of the invention, the first solvent is selected from cyclohexanol, 1-hexanol, 2-hexanol, 3-hexanol, cis-2-hexen-1-ol, trans-2-hexen-1-ol, cycloheptanol, 1-heptanol, 2-heptanol, 2-ethyl-1-hexanol, 1-octanol, 1-nonanol, 3,5,5-trimethyl-1-hexanol, 1-decanol, α-terpineol, 3,7-dimethyl-3-octanol (tetrahydrolinalool), and mixtures thereof; and the second solvent is mineral spirits or a fraction thereof. In a further preferred aspect of the invention, the first solvent is 1-hexanol or 1-heptanol and the second solvent is mineral spirits. In a separate preferred aspect of the invention, the first solvent is selected from N,N-dimethylformamide, N-methylpyrrolidinone, N,N-dimethylacetamide, tetramethylurea, and mixtures thereof, and the second solvent is a terpene hydrocarbon or mixture of terpene hydrocarbons. Preferably, the second solvent is up to 80 wt % of the total solvent of the ink composition; more preferably the second solvent is 5–70 wt % of the total solvent of the ink composition; still more preferably the second solvent is 10–60 wt % of the total solvent of the ink composition; even still more preferably the second solvent is 15–55 wt % of the total solvent of the ink composition; yet even still more preferably the second solvent is 25–50 wt % of the total solvent of the ink composition.

In an optional aspect of the invention, the solvent further comprises a third solvent selected from α-hydroxy-carboxylic ester, polyalkylene glycol alkyl ether, and ketone-containing solvnets. Illustrative of these are (without limitation) methyl lactate, ethyl lactate, n-propyl lactate, and isopropyl lactate as exemplary α-hydroxy-carboxylic esters; diethylene glycol methyl ether and dipropylene glycol methyl ether as exemplary polyalkylene glycol alkyl ethers; and cyclohexanone as an exemplary ketone-containing solvent. Preferably the third solvent is selected from ethyl lactate, dipropylene glycol methyl ether, cyclohexanone, and mixtures thereof. Also preferably, the third solvent is up to 50% by weight of the organic solvent in the ink of the invention; more preferably the third solvent is up to 40% by weight of the organic solvent in the ink of the invention; even more preferably the third solvent is up to 35% by weight of the organic solvent in the ink of the invention.

In other preferred aspects, the printing ink of the present invention has a viscosity of less than 25 cps at one or more temperatures between 25° C. and 60° C., and/or said ink has a flash point of greater than 40° C. Ink viscosity, flash point, and solvent evaporation are three physical properties of concern in inkjet inks, and more particularly in DOD inks. Because inks in DOD printers are typically allowed to stand for extended periods of time in the discharge orifices of the print head during stand-by periods, if the ink is too viscous it likely will solidify in the print head and clog the orifices. Similarly, if the solvent of said ink is too volatile, there is increased likelihood that the ink solvent will evaporate over time, allowing the ink binder to concentrate and become more viscous. In addition, the more volatile an ink solvent, the greater the chance of flammable vapor accumulation, making such inks particularly unsafe for air transport, where conditions of low atmospheric pressure and confined spaces prevail. Therefore, inks comprising solvents with suitably high boiling points and flash points are preferred. Preferably, the printing ink of the present invention has a flash point of greater than 40° C.; more preferably, the printing ink of the present invention has a flash point of greater than 50° C.; even more preferably the printing ink of the present invention has a flash point of greater than 55° C.; yet even more preferably the printing ink of the present invention has a flash point of greater than 60° C.

The ink vehicle (i.e., the ink less the colorant) consists of from about 5% to 40% polyamide resin and from 35% to 95% by weight of the solvent. The colorant of the invention can be any one of numerous suitable dyes or pigments currently offered for sale for use in DOD inkjet inks. Suitable colorants are available from, for example, Clariant (Muttenz (near Basel), Switzerland), Ciba Speciality Chemicals (Basel, Switzerland), and Day-Glo Color (Cleveland, Ohio, USA). The colorant is typically present in the ink at a level of about 1–10% by weight, where this level may be increased or decreased depending on the desired color instensity of the ink, so long as viscosity values are not exceeded.

Ink preparation is well known and any one of the many art methods is satisfactory. For example, vehicle is first prepared by heating the mixture of solvent and optional co-solvent to about 50–100° C. and adding, with stirring under an inert atmosphere, polyamide resin pellets. Stirring is continued until the resin dissolves. The mixture is then cooled to about 30–60° C. and the dye or pigment charged with continued stirring until a homogeneous mixture is obtained. For pigmented inks, this ink may be then fed through a shot mill or other finishing device to insure the pigment particles are broken down. Finally, the ink is filtered to remove particles too large to flow through the small nozzles of the DOD printer, and bottled.

The invention is illustrated in more detail by the following examples. In the following examples, chemicals were of reagent grade unless noted otherwise, and were obtained from commercial supply houses such as Aldrich Chemical Co. (Milwaukee, Wis.). UNI-REZ® 2000-series dimer acid polyamides, UNITOL™ BKS tall oil fatty acid, and UNIDYME™ 14 dimer acid were obtained from Arizona Chemical (Jacksonville, Fla.). DOWANOL™ DPM dipropylene glycol methyl ether was obtained from The Dow Chemical Co. (Midland, Mich.). DBE is "dibasic esters", a mixture of the refined dimethyl esters of adipic, glutaric and succinic acids which are all naturally occurring materials. DBE, as well as ELVAX® 40W poly(vinylacetate) resin, DECALIN™ hydrocarbon solvent, and MYLAR™ polymeric film, were obtained from DuPont (Wilmington, Del.). "Solvent 142", as referred to herein as "HC142" is mineral spirits as obtained from Ashland, Inc. (Columbus, Ohio). UNITENE™ D and TERPINOLENE™ 90 terpenes were obtained from International Flavors and Fragrances (New York, N.Y.). SCOTCH™ 600 and SCOTCH™ 610 cellophane tape were obtained from 3M (St. Paul, Minn.). UCAR™ 500XP vinyl polymer resin was obtained from Union Carbide (Danbury, Conn.).

EXAMPLE 1

Solvent Selection Criteria for Dimer Acid-Based Polyamide Digital Ink

TABLE 1 sets forth criteria that are evaluated when selecting a solvent for an ink composition according to the present invention.

TABLE 1

WIDE FORMAT INK SOLVENT CRITERIA

| Criteria Type | Criteria Level Desired | Reason for Criteria |
| --- | --- | --- |
| Flash Point | As close to 61° C. as possible | Allows shipment as non-hazardous |
| Evaporation Rate | As high as possible | Leads to faster print speeds |
| Viscosity | As low as possible | Allows for more resin in solution |
| Stability | A 20% solids solution of resin must remain fluid even if chilled | Must not change in viscosity (or gel) when shipped by air. |
| Cost | Good if same as glycol ethers | Some increased cost over current solvent may be acceptable, but not desired. |
| Toxicity | A "2" health rating or less; one with an environmentally-friendly image would be best. | Highly toxic solvents will require special (expensive) ventilation of the press. |
| Odor | A "pleasant" odor is best, "bland" is good. | Unpleasant solvents will require special (expensive) ventilation of the press. |

EXAMPLES 2–6

Candidate Protic Solvents for Formulating Low Volatility Dimer Acid-Based Polyamide Inkjet Inks In these examples, various protic solvents were assessed as candidates to solubilize polyamide resin selected from Arizona Chemical's UNI-REZ® 2000-series of polymerized fatty acid-based polyamide resins. These solvents were assessed according to criteria set forth in EXAMPLE 1. Solvent properties are summarized in TABLE 2.

Of the protic aliphatic solvents tested, 1-hexanol, having suitable resin solubility, the fastest evaporation rate and lowest viscosity of the tested alcohols having an acceptable flash point, exhibited the most suitable properties for use with dimer acid-based polyamide resins. However, all alcohols tested had high viscosities relative to other candidate solvents (summarized in TABLE 2 and TABLE 3). Therefore, it is recommended to use only enough of a protic aliphatic solvent as needed to stabilize the resin solution if so required.

Of the two protic polar solvents tested, neither ethyl lactate nor DOWANOL™ DPM dipropylene glycol methyl ether dissolved polyamide resin as well as the protic aliphatic solvents. However, both of these protic polar solvents may be used in small quantities with polyamide resin to adjust flash point, evaporation rate, and possibly adhesion to substrate.

TABLE 2

PHYSICAL PROPERTIES OF CANDIDATE PROTIC SOLVENTS FOR FORMULATING LOW VOLATILITY JET INKS

| | Solvent Type | | | | |
| --- | --- | --- | --- | --- | --- |
| | PROTIC ALIPHATIC | | | PROTIC POLAR | |
| | Example | | | | |
| | 2 | 3 | 4 | 5 | 6 |
| Name | 1-Hexanol | 2-Ethylhexanol | 1-Octanol | Ethyl lactate | DOWANOL ™ DPM |
| CAS Number | 111-27-3 | 104-76-7 | 111-87-5 | 687-47-8 | 34590-94-8 |
| Flash Point (° C.) | 60 | 73 | 81 | 49 | 78 |
| Boiling Point (° C.) | 156.5 | 182 | 196 | 154 | 188 |
| Freezing Point (° C.) | −52 | −76 | −15 | −26 | −80 |
| Viscosity (cps @ 25° C.) | ca. 6 | ca. 9 | 10.6(15° C.) | 2.4 | 0.95 |
| Evaporation Rate (% of BA)* | 0.05 | 0.01 | — | 0.21 | 0.03 |

TABLE 2-continued

PHYSICAL PROPERTIES OF CANDIDATE PROTIC SOLVENTS
FOR FORMULATING LOW VOLATILITY JET INKS

| | Solvent Type | | | | |
|---|---|---|---|---|---|
| | PROTIC ALIPHATIC | | | PROTIC POLAR | |
| | Example | | | | |
| | 2 | 3 | 4 | 5 | 6 |
| Density (at 25° C.) | 0.814 | 0.834(20° C.) | 0.827 | 1.042 | 0.951(20° C.) |
| Odor | Pleasant | Light, fruity | Unpleasant | Fruity | Bland, paint-like |
| Preferred co-solvent? (+: moderately; ++: strongly; −: not preferred) | ++ | + | + | − | − |

*100% evaporation rate is equated to the evaporation rate of n-butyl acetate.

EXAMPLES 7–11

Candidate Aprotic Solvents for Formulating Low Volatility Dimer Acid-Based Polyamide Inkjet Inks In these examples, various aprotic solvents were assessed as candidates to solubilize polyamide resin selected from Arizona Chemical's UNI-REZ® 2000-series of polymerized fatty acid-based polyamide resins. These solvents were assessed according to criteria set forth in EXAMPLE 1. Solvent properties are summarized in TABLE 3.

Of the two aprotic polar solvents tested (cyclohexanone and, DBE), cyclohexanone exhibited better polyamide solubility, but would be too volatile for use in more than minor portions. However, these solvents may be used in minor amounts in order to provide improved flash points, evaporation rates, and/or solution stability.

Of the aprotic nonpolar solvents tested, all were shown to be suitable for use with polymerized fatty acid-based polyamide resins, though most suitable when in admixture with at least one other solvent. Mineral spirits, as exemplified by Solvent 142, was inexpensive, had a bland odor, a low viscosity, a relatively high evaporation rate, and an optimal flash point according to EXAMPLE 1. Accordingly, mineral spirits is a preferred solvent for inclusion in the ink compositions of the present invention. Dipentene solvents such as UNITENE™ D terpene solvent and in particular TERPINOLENE™ 90 terpene solvent, having mild pine odors and flash points greater than 49° C., were also good solvents for use with dimer acid-based polyamide resins (data not shown).

TABLE 3

PHYSICAL PROPERTIES OF CANDIDATE APROTIC SOLVENTS
FOR FORMULATING LOW VOLATILITY JET INKS

| | Solvent Type | | | | |
|---|---|---|---|---|---|
| | APROTIC POLAR | | APROTIC NONPOLAR | | |
| | Example | | | | |
| | 7 | 8 | 9 | 10 | 11 |
| Name | Cyclohexanone | DBE | Limonene | Solvent 142 | DECALIN™ |
| CAS Number | 108-94-1 | 627-93-0 | 5989-27-5 | 64742-88-7 | 91-17-8 |
| Flash Point (° C.) | 47 | 100 | 46 | 63 | 57 |
| Boiling Point (° C.) | 155 | 196–225 | 177 | 189–202 | 190 |
| Freezing Point (° C.) | −47 | −20 | — | — | −125 |
| Viscosity (cps @ 25° C.) | 2.0 | 2.4 | (ca. 1.5) | (ca. 1.5) | (ca. 3) |
| Evaporation Rate (% of BA) | 0.29 | 0.01 | — | — | — |
| Density (at 25° C.) | 0.947 | 1.097 | — | 0.782(16° C.) | 0.896 |
| Odor | Fruity, cheesy | Bland | Citrus | Bland, like mineral oil | Light, like mineral oil |
| Preferred co-solvent? (+: moderately; ++: strongly; −: not preferred) | − | − | + | ++ | + |

EXAMPLES 12–16

Candidate Aprotic Tertiary Amide and Carbamide Solvents for Formulating Low Volatility Dimer Acid-Based Polyamide Inkjet Inks In these examples, various aprotic tertiary amide and carbamide solvents were assessed as candidates to solubilize polyamide resin selected from Arizona Chemical's UNI-REZ® 2000-series of polymerized fatty acid-based polyamide resins. These solvents were assessed according to criteria set forth in EXAMPLE 1. Solvent properties are summarized in TABLE 4.

Of the aprotic tertiary amide and carbamide solvents tested, NMP and TMU exhibited the most suitable properties for use with dimer acid-based polyamide resins, though each preferably in admixture with at least one other solvent for optimal solvent usage. By contrast, DMF, having a pungent fishy odor, and DMAC, being somewhat toxic, were deemed less suitable for use as solvents or co-solvents with dimer acid-based polyamide resins. In one aspect, NMP or TMU could be used to stabilize these resins in solution, possibly in place of 1-hexanol or blended with 1-hexanol to lower the solution viscosity.

EXAMPLES 17–39

Viscosities of Candidate Resin Solvent Systems for Formulating Low Volatility Dimer Acid-Based Polyamide Inkjet Inks These examples disclose viscosity values for various solvent systems upon admixture with 20–30 wt % UNI-REZ® 2221 polymerized fatty acid-based polyamide resin. Results are summarized in TABLE 5. Comparative examples are denoted by "c" following the example number.

TABLE 4

PHYSICAL PROPERTIES OF CANDIDATE APROTIC TERTIARY AMIDE AND CARBAMIDE SOLVENTS FOR FORMULATING LOW VOLATILITY JET INKS

| | Solvent Type APROTIC TERTIARY AMIDES Example | | | | |
|---|---|---|---|---|---|
| | 12 | 13 | 14 | 15 | 16 |
| Name | Dimethyl-formamide | Tetramethyl-urea | Dimethyl-acetamide | N-Methyl-pyrrolidinone | Dimethyl-imidazolidinone |
| Abbreviated name | DMF | TMU | DMAC | NMP | DMI |
| CAS Number | 68-12-2 | 632-22-4 | 127-19-5 | 872-50-4 | 80-73-9 |
| Flash Point (° C.) | 57 | 66 | 70 | 91 | 80 |
| Boiling Point (° C.) | 153 | 177 | 165 | 204 | 107 @ 17 mm Hg |
| Freezing Point (° C.) | −61 | −1 | −20 | −24 | |
| Viscosity (cps @ 25° C.) | 0.82 | — | 1.02 | 1.7 | — |
| Evaporation Rate (% of BA) | 0.20 | — | — | 0.06 | — |
| Density (at 25° C.) | 0.938 | 0.971 | 0.937 | 1.04 | 1.044 |
| Odor | Fishy | Light amine; fishy | Bland, pleasant | Bland | Light amine; fishy |
| Preferred co-solvent? (+: moderately; ++: strongly; −: not preferred) | − | ++ | − | ++ | n.d.* |

*n.d., not determined.

TABLE 5

BROOKFIELD VISCOSITIES (CPS, 25° C.) OF TEST SOLUTIONS OF UNI-REZ ® 2221

| Example | Description of the Solvent or Solvent Blend [wt:wt] | 20% Solids | 25% Solids | 30% Solids |
|---|---|---|---|---|
| 17c | 1-Hexanol | 23.0 | — | 51.8 |
| 18c | N-Methylpyrrolidinone (NMP) | — | — | 24.0 |
| 19c | Dimethylacetamide (DMAC) | Ca. 5 | — | 12.3 |
| 20c | Dimethylimidazolidinone (DMI) | — | — | 34.9 |
| | Two-component solvent blends | | | |
| 21 | Hexanol + DECALIN ™ [50:50] | 20.9 | — | — |
| 22 | Hexanol + DECALIN ™ [35:65] | 22.0 | — | — |
| 23 | Hexanol + HC142 [67:33] | 16.9 | — | — |
| 24 | Hexanol + HC142 [40:60] | — | 23.0 | — |
| 25 | Hexanol + HC142 [35:65] | 13.4 | 22.4 | 40.0 |
| 26 | 2-Ethyl Hexanol + TERPINOLENE ™ 90 [30:70] | — | 32.0 | — |

TABLE 5-continued

BROOKFIELD VISCOSITIES (CPS, 25° C.) OF
TEST SOLUTIONS OF UNI-REZ ® 2221

| Example | Description of the Solvent or Solvent Blend [wt:wt] | 20% Solids | 25% Solids | 30% Solids |
|---|---|---|---|---|
| 27 | NMP + DECALIN ™ [43:57] | — | — | 33.4 |
| 28 | NMP + Limonene [80:20] | — | 14.3 | — |
| 29 | NMP + Limonene [50:50] | — | — | 21.8 |
| 30 | TMU + Limonene [50:50] | — | — | 18.8 |
| 31 | DMI + Limonene [50:50] | — | — | 23.5 |
| 32c | NMP + DPM* [60:40] | — | — | 35.7 |
| 33c | NMP + Butyl Acetate [67:33] | — | — | 19.1 |
| | Multi-component solvent blends | | | |
| 34 | Hexanol + DPM* + DECALIN ™ [50:25:25] | 19.8 | — | — |
| 35 | Hexanol + NMP + HC142 [33:33:33] | — | 17.4 | — |
| 36 | Hexanol + NMP + HC142 + Limonene [20:30:40:10] | — | 15.6 | — |
| 37 | Hexanol + DPM* + DECALIN ™ [34:33:33] | 19.7 | — | — |
| 38 | Hexanol + DMAC + DECALIN ™ [12.5:37.5:50] | 9.4 | — | 23.4 |
| 39 | NMP + DPM* + HC142 + Limonene [33.3:33.3:25:8.3] | 12.3 | — | 32.5 |

*DPM: DOWANOL ™ DPM dipropylene glycol methyl ether.

EXAMPLES 40–44

Viscosities of Candidate Resin Solvent Systems for Formulating Low Volatility Dimer Acid-Based Polyamide Inkjet Inks These examples disclose viscosity values for various solvent systems upon admixture with 25–30 wt % UNI-REZ® 2224 polymerized fatty acid-based polyamide resin. Results are summarized in TABLE 6.

TABLE 6

VISCOSITY DATA FOR TEST SOLUTIONS OF UNI-REZ ® 2224

| Example | Description of the Solvent or Solvent Blend [wt:wt] | 25% Solids | 30% Solids |
|---|---|---|---|
| 40 | Hexanol + Solvent 142 [40:60] | 15.2 | — |
| 41 | NMP + Limonene [80:20] | 7.6 | — |
| 42 | NMP + Limonene [50:50] | — | 12.7 |
| 43 | Hexanol + NMP + Solvent 142 [33:33:33] | 11.6 | — |
| 44 | Hexanol + NMP + Solvent 142 + Limonene [20:30:40:10] | 10.2 | — |

EXAMPLES 45–50

Viscosities of Candidate Resin Solvent Systems for Formulating Low Volatility Dimer Acid-Based Polyamide Inkjet Inks These examples disclose viscosity values for various solvent systems upon admixture with 15–20 wt % UNI-REZ® 2226 polymerized fatty acid-based polyamide resin. Results are summarized in TABLE 7.

TABLE 7

VISCOSITY DATA FOR TEST SOLUTIONS OF UNI-REZ ® 2226

| | Percentage of Each Solvent Component in Blend | | | | Brookfield Viscosity Data | | | |
|---|---|---|---|---|---|---|---|---|
| Example | Mineral Spirits | NMP | Limonene | Hexanol | wt % Resin | Viscosity (cps) | wt % Resin | Viscosity (cps) |
| 45 | 40 | — | — | 60 | 15 | 13.5 | 20 | 20.7 |
| 46 | 40 | 30 | — | 30 | 15 | 8.3 | 20 | 14.1 |
| 47 | 40 | 30 | 15 | 15 | 15 | Gelled | 20 | 11.7 |
| 48 | 20 | 45 | 20 | 15 | 15 | 7.2 | 20 | 12.0 |
| 49 | — | 60 | 25 | 15 | 15 | 7.4 | 20 | 12.7 |
| 50 | — | 75 | 25 | — | 15 | 7.2 | 20 | 11.7 |

EXAMPLES 51–56

Viscosities of Candidate Resin Solvent Systems for Formulating Low Volatility Dimer Acid-Based Polyamide Inkjet Inks These examples disclose viscosity values for various solvent systems upon admixture with 15–20 wt % UNI-REZ® 2215 polymerized fatty acid-based polyamide resin. Results are summarized in TABLE 8.

TABLE 8

VISCOSITY DATA FOR TEST SOLUTIONS OF UNI-REZ ® 2215

| | Percentage of Each Solvent Component in Blend | | | | Brookfield Viscosity Data | | | |
|---|---|---|---|---|---|---|---|---|
| Example | Mineral Spirits | NMP | Limonene | Hexanol | wt % Resin | Viscosity (cps) | wt % Resin | Viscosity (cps) |
| 51 | 40 | — | — | 60 | 15 | 16.7 | 20 | 29.5 |
| 52 | 40 | 30 | — | 30 | 15 | 10.8 | 20 | 19 |
| 53 | 40 | 30 | 15 | 15 | 15 | 9.1 | 20 | 15.8 |
| 54 | 20 | 45 | 20 | 15 | 15 | 9.8 | 20 | 16.6 |
| 55 | — | 60 | 25 | 15 | 15 | 10.1 | 20 | 17.1 |
| 56 | — | 75 | 25 | — | 15 | 9.3 | 20 | 16.2 |

EXAMPLES 57–77

Stability of Dimer Acid-Based Polyamide Resin Solutions

In these examples, solutions of UNI-REZ® 2221 polymerized fatty acid-based polyamide resin in various solvents were analyzed for solution stability in terms of clarity, fluidity, and homogeneity.

Solutions of resin in indicated solvent systems were heated with stirring to about 100° C. for less than about 30 minutes under inert atmosphere. Solutions were then cooled to ambient temperature with stirring, then poured into covered glass containers and allowed to sit at ambient temperature for 24 hours. Samples were then subjected to three sequential freeze-thaw cycles as follows: For the first freeze-thaw cycle samples were cooled to 0° C. for 24 hours, then warmed to 25° C. for 24 hours. For the second freeze-thaw cycle samples were cooled to 0° C. for 24 hours, then warmed to 25° C. for 24 hours. For the third freeze-thaw cycle samples were cooled to 0° C. for 48 hours, then warmed to 25° C. for 24 hours.

After each freeze-thaw cycle, vessels containing samples were gently tipped and assessed for clarity, fluidity, and solution homogeneity. Samples determined to be clear, completely fluid and homogeneous throughout a freeze-thaw cycle were deemed to have "passed" a solution stability test and were then subjected to the next freeze-thaw cycle. Samples that became gelled upon freezing but that reverted to a clear, homogeneous and completely fluid state upon thawing were identified as having "recovered" from a solution stability test, and were then subjected to the next freeze-thaw cycle. Samples that neither passed nor recovered from a solution stability test were deemed to have "failed" said solution stability test, and were not subjected to further testing. Results of the foregoing test procedure are summarized in TABLE 9.

TABLE 9

FREEZE-THAW STABILITY TESTING OF UNI-REZ ® 2221 SOLUTIONS

| Example | Resin Wt % | 1st Solvent | Amt. % | 2nd Solvent | Amt. % | 3rd Solvent | Amt. % | Frz/Thw Cycle1 | Frz/Thw Cycle 2 | Frz/Thw Cycle3 |
|---|---|---|---|---|---|---|---|---|---|---|
| 57 | 20 | Hexanol | 67 | Solvent 142 | 33 | — | — | Passed | Passed | Passed |
| 58 | 20 | Hexanol | 50 | Solvent 142 | 25 | Cyclo-hexanone | 25 | Passed | Passed | Passed |
| 59 | 20 | Hexanol | 50 | Solvent 142 | 25 | DPM# | 25 | Passed | Passed | Passed |
| 60 | 20 | Hexanol | 50 | Solvent 142 | 25 | Ethyl lactate | 25 | Passed | Passed | Passed |
| 61 | 20 | Hexanol | 50 | Solvent 142 | 50 | — | — | Passed | Passed | Passed |
| 62 | 20 | Hexanol | 50 | DECALIN ™ | 50 | — | — | Passed | Passed | Passed |
| 63 | 20 | Hexanol | 50 | DECALIN ™ | 25 | DPM# | 25 | Passed | Passed | Passed |
| 64 | 20 | Hexanol | 35 | Solvent 142 | 65 | — | — | Passed | Recovered | Passed |
| 65 | 20 | Hexanol | 35 | DECALIN ™ | 65 | — | — | Passed | Passed | Passed |
| 66 | 20 | Hexanol | 35 | Solvent 142 | 32.5 | Cyclo-hexanone | 32.5 | Passed | Passed | Passed |
| 67 | 20 | Hexanol | 35 | DECALIN ™ | 32.5 | Cyclo-hexanone | 32.5 | Passed | Passed | Passed |
| 68 | 20 | Hexanol | 35 | DECALIN ™ | 32.5 | DPM# | 32.5 | Passed | Passed | Passed |
| 69 | 20 | 2-Ethyl-hexanol | 35 | DECALIN ™ | 32.5 | Cyclo-hexanone | 32.5 | Passed | Passed | Passed |
| 70 | 20 | 2-Ethyl-hexanol | 35 | DECALIN ™ | 65 | — | — | Passed | Recovered | Failed* |
| 71 | 30 | Solvent 142 | 65 | Hexanol | 35 | — | — | Failed | — | — |
| 72 | 25 | Solvent 142 | 65 | Hexanol | 35 | — | — | Failed* | — | — |
| 73 | 20 | NMP | 50 | Limonene | 50 | — | — | Passed | Passed | Passed |

TABLE 9-continued

FREEZE-THAW STABILITY TESTING OF UNI-REZ ® 2221 SOLUTIONS

| Example | Resin Wt % | 1st Solvent | Amt. % | 2nd Solvent | Amt. % | 3rd Solvent | Amt. % | Frz/Thw Cycle1 | Frz/Thw Cycle 2 | Frz/Thw Cycle3 |
|---|---|---|---|---|---|---|---|---|---|---|
| 74 | 30 | NMP | 33 | Solv. 142/Limonene | 25/8.3 | DPM# | 33 | Failed | — | — |
| 75 | 20 | NMP | 33 | Solv. 142/Limonene | 25/8.3 | DPM# | 33 | Failed | — | Recovered |
| 76 | 30 | Limonene | 50 | NMP | 50 | — | — | Recovered | Recovered | Recovered |
| 77 | 30 | NMP | 42.9 | DECALIN ™ | 57.1 | — | — | Passed | Passed | Recovered |

*Very slightly viscous.
DPM: DOWANOL ™ DPM dipropylene glycol methyl ether.

EXAMPLES 78–99

Comparative

Stability of Dimer Acid-Based Polyamide Resin Solutions

In these examples, solutions of UNI-REZ® 2221 polymerized fatty acid-based polyamide resin in various solvents were analyzed for solution stability in terms of clarity, fluidity, and homogeneity. Samples were prepared, treated, and analyzed in the manner described in EXAMPLES 57–77. Results are summarized in TABLE 10.

EXAMPLES 100–102

Stability of Dimer Acid-Based Polyamide Resin Solutions

In these examples, solutions of UNI-REZ® 2224 polymerized fatty acid-based polyamide resin in various solvents were prepared and analyzed for solution stability in terms of clarity, fluidity, and homogeneity, in a manner similar to that described for the third freeze-thaw cycle in EXAMPLES 57–77. Results of this analysis are summarized in TABLE 11.

TABLE 10

FREEZE-THAW STABILITY TESTING OF UNI-REZ ® 2221 SOLUTIONS

| Example | Resin Wt % | 1st Solvent | Amt. % | 2nd Solvent | Amt. % | 3rd Solvent | Amt. % | Frz/Thw Cycle1 | Frz/Thw Cycle 2 | Frz/Thw Cycle3 |
|---|---|---|---|---|---|---|---|---|---|---|
| 78 | 30 | Hexanol | 100 | — | — | — | — | Passed | Passed | Recovered |
| 79 | 25 | Hexanol | 100 | — | — | — | — | Passed | Passed | Passed |
| 80 | 20 | Hexanol | 100 | — | — | — | — | Passed | Passed | Passed |
| 81 | 15 | Hexanol | 100 | — | — | — | — | Passed | Passed | Passed |
| 82 | 10 | Hexanol | 100 | — | — | — | — | Passed | Passed | Passed |
| 83 | 20 | Hexanol | 67 | — | — | Ethyl lactate | 33 | Passed | Passed | Passed |
| 84 | 20 | Hexanol | 67 | — | — | DPM# | 33 | Passed | Passed | Passed |
| 85 | 20 | Hexanol | 67 | — | — | Cyclohexanone | 33 | Passed | Passed | Passed |
| 86 | 20 | Hexanol | 50 | — | — | Cyclohexanone/DPM# | 25/25 | Passed | Passed | Recovered |
| 87 | 20 | Hexanol | 50 | — | — | Ethyl lactate/DPM# | 25/25 | Passed | Passed | Passed |
| 88 | 20 | Hexanol | 50 | — | — | DPM# | 50 | Failed | — | — |
| 89 | 20 | — | — | — | — | Cyclohexanone/Ethyl lactate | 50/50 | Passed | Passed | Passed |
| 90 | 20 | Hexanol | 35 | — | — | Cyclohexanone | 65 | Recovered | Recovered | Recovered |
| 91 | 20 | Hexanol | 35 | — | — | Cyclohexanone/DPM# | 32.5/32.5 | Recovered | Recovered | Recovered |
| 92 | 20 | 2-Ethyl-hexanol | 35 | — | — | Cyclo-hexanone | 65 | Recovered | Failed | Failed* |
| 93 | 20 | DMAC | 100 | — | — | — | — | Failed** | — | — |
| 94 | 20 | NMP | 100 | — | — | — | — | Recovered | Recovered | Recovered |
| 95 | 20 | NMP | 68.6 | Butyl acetate | 31.4 | — | — | Recovered | Recovered | Recovered |
| 96 | 30 | DMAC | 100 | — | — | — | — | Failed | — | — |
| 97 | 30 | NMP | 100 | — | — | — | — | Recovered | Failed* | — |
| 98 | 30 | NMP | 69 | Butyl acetate | 31 | — | — | Failed | — | — |
| 99 | 20 | — | — | DECALIN ™ | 50 | Ethyl lactate | 50 | Passed | Passed | Passed |

*Very slightly viscous.
**If shaken, almost recovers.
DPM: DOWANOL ™ DPM dipropylene glycol methyl ether.

TABLE 11

UNI-REZ® 2224 FREEZE-THAW STABILITY TEST RESULTS

| Example | Description of the Solvent or Solvent Blend [wt:wt] | At 25% Solids |
|---------|-----------------------------------------------------|---------------|
| 100 | Hexanol + Solvent 142 [40:60] | Recovered[1] |
| 101 | NMP + Limonene [80:20] | Failed[2] |
| 102 | Solvent 142 + NMP + Hexanol + Limonene [40:30:20:10] | Failed[2] |

[1]Recovered after gelling during each of the three freeze periods.
[2]Gelled during the first freeze period and did not recover fluidity when warmed.

EXAMPLES 103–108

Stability of Dimer Acid-Based Polyamide Resin Solutions

In these examples, solutions of UNI-REZ® 2226 polymerized fatty acid-based polyamide resin in various solvents were prepared and analyzed for solution stability in terms of clarity, fluidity, and homogeneity, in a manner similar to that described for the third freeze-thaw cycle in EXAMPLES 57–77. Results of this analysis are summarized in TABLE 12.

TABLE 12

FREEZE-THAW STABILITY RESULTS FOR TEST SOLUTIONS OF UNI-REZ® 2226

| | Percentage of Each Solvent Component in Blend | | | | Freeze-Thaw Test | | | |
|---|---|---|---|---|---|---|---|---|
| Example | Mineral Spirits | NMP | Limonene | 1-Hexanol | wt % Resin | Result | wt % Resin | Result |
| 103 | 40 | — | — | 60 | 15 | Passed | 20 | Recovered |
| 104 | 40 | 30 | — | 30 | 15 | Failed | 20 | Failed |
| 105 | 40 | 30 | 15 | 15 | 15 | Not Done | 20 | Failed |
| 106 | 20 | 45 | 20 | 15 | 15 | Recovered | 20 | Failed |
| 107 | — | 60 | 25 | 15 | 15 | Passed | 20 | Recovered |
| 108 | — | 75 | 25 | — | 15 | Passed | 20 | Recovered |

EXAMPLES 109–114

Stability of Dimer Acid-Based Polyamide Resin Solutions

In these examples, solutions of UNI-REZ® 2215 polymerized fatty acid-based polyamide resin in various solvents were prepared and analyzed for solution stability in terms of clarity, fluidity, and homogeneity, in a manner similar to that described for the third freeze-thaw cycle in EXAMPLES 57–77. Results of this analysis are summarized in TABLE 13.

TABLE 13

FREEZE-THAW STABILITY RESULTS FOR TEST SOLUTIONS OF UNI-REZ® 2215

| | Percentage of Each Solvent Component in Blend | | | | Freeze-Thaw Test | | | |
|---|---|---|---|---|---|---|---|---|
| Example | Mineral Spirits | NMP | Limonene | 1-Hexanol | wt % Resin | Result | wt % Resin | Result |
| 109 | 40 | — | — | 60 | 15 | Passed | 20 | Passed |
| 110 | 40 | 30 | — | 30 | 15 | Passed | 20 | Failed |
| 111 | 40 | 30 | 15 | 15 | 15 | Passed | 20 | Failed |
| 112 | 20 | 45 | 20 | 15 | 15 | Passed | 20 | Passed |
| 113 | — | 60 | 25 | 15 | 15 | Passed | 20 | Passed |
| 114 | — | 75 | 25 | — | 15 | Passed | 20 | Passed |

EXAMPLES 115–123

Stability of Dimer Acid-Based Polyamide Resin in Terpene Solutions

In these examples, solutions of polymerized fatty acid-based polyamide resin in various solvents comprising terpene were prepared and analyzed for viscosity and solution stability in terms of clarity, fluidity, and homogeneity, in a manner similar to that described for the third freeze-thaw cycle in EXAMPLES 57–77. Results of this analysis are summarized in TABLE 14.

method," wherein a sample solution was heated in a closed vessel, a flame was applied to the vapor space above said solution, and the temperature at which vapor ignition occurred was defined as the flash point for said solution. Measurement results are summarized in TABLE 15. Comparative examples are denoted by "c" following the example number.

TABLE 14

VISCOSITY AND FREEZE-THAW STABILITY RESULTS FOR TEST SOLUTIONS CONTAINING TERPENES

| Example | Resin | wt % | NMP | Limonene | Solvent 142 | TERPINOLENE ™ 90 | UNITENE ™ D | Hexanol | Viscosity (cps) | Cycle Result |
|---|---|---|---|---|---|---|---|---|---|---|
| 115 | UNI-REZ ® 2221 | 25 | 100 | — | — | — | — | — | 16.0 | Failed |
| 116 | UNI-REZ ® 2221 | 25 | 60 | 20 | 20 | — | — | — | 14.1 | Recovered |
| 117 | UNI-REZ ® 2221 | 25 | 60 | — | — | 40 | — | — | 14.6 | Passed |
| 118 | UNI-REZ ® 2215 | 20 | — | — | — | — | 67 | 33 | 24.4 | Failed |
| 119 | UNI-REZ ® 2229 | 25 | 100 | — | — | — | — | — | 27.4 | Failed |
| 120# | UNI-REZ ® 2229 | 25 | 100 | — | — | — | — | — | 26.9 | Failed |
| 121 | UNI-REZ ® 2229 | 25 | 80 | 20 | — | — | — | — | 24.9 | Recovered |
| 122 | UNI-REZ ® 2229 | 25 | 60 | 20 | 20 | — | — | — | 22.4 | Recovered |
| 123 | UNI-REZ ® 2229 | 20 | — | — | 40 | — | — | 60 | 23.7 | Passed |

Replicate of Example 133.

TABLE 15

FLASH POINTS OF TEST SOLUTIONS OF UNI-REZ ® 2221

| | Percentage of Each Solvent Component in Blend | | | | | wt % | Closed Cup |
|---|---|---|---|---|---|---|---|
| Example | Mineral Spirits | Amyl Acetate | NMP | Limonene | 1-Hexanol | UNI-REZ ® 2221 | Flash Point(° C.) |
| 124 | — | — | 100 | — | — | 20 | 88 |
| 125 | — | — | 84 | 16 | — | 20 | 64 |
| 126 | — | — | 80 | 20 | — | 25 | 63 |
| 127 | — | — | 69 | 31 | — | 20 | 57 |
| 128 | — | — | 69 | 31 | — | 30 | 58 |
| 129 | 50 | — | — | — | 50 | 25 | 56 |
| 130 | 40 | — | — | — | 60 | 25 | 58 |
| 131 | 40 | — | 30 | 10 | 20 | 25 | 59 |
| 132c | — | 31 | 69 | — | — | 30 | 54 |
| 133c | — | 20 | 60 | 20 | — | 30 | 54 |

EXAMPLES 124–133

Determination of Flash Points for Solutions of Dimer Acid-Based Polyamide Resin

In these examples, flash points of solutions of UNI-REZ® 2221 polymerized fatty acid-based polyamide resin in various solvent systems were measured by the "closed cup

EXAMPLES 134–139

Determination of Flash Points for Blended Terpene Solutions

In these examples, flash points blended monoterpene solvent systems were measured by the "closed cup method," wherein a sample solution was heated in a closed vessel, a flame was applied to the vapor space above said solution, and the temperature at which vapor ignition occurred was defined as the flash point for said solution. Measurement results are summarized in TABLE 16.

"passed" the adhesion test if no resin was transferred to the tape; otherwise the resin was deemed to have "failed" the adhesion test. Results of these tests are summarized in TABLE 17.

TABLE 17

ADHESIVE TAPE TEST RESULTS

| Example | Resin | Resin Type | Vinyl | LLDPE | PP | MYLAR ™ |
|---------|-------|------------|-------|-------|-----|---------|
| 140 | UNI-REZ ® 2930 | Conventional Polyamide | Passed | Failed | Passed | Passed |
| 141 | UNI-REZ ® 2221 | Conventional Polyamide | Passed | Passed | Passed | Passed |
| 142 | UNI-REZ ® 2215 | Conventional Polyamide | Passed | Failed | Passed | Passed |
| 143 | UN1-REZ ® 2209 | Conventional Polyamide | Passed | Passed | Passed | Passed |
| 144 | 0014-123-A[1] | EDA + HMDA Polyamide | Passed | Passed | Passed | Passed |
| 145 | 0014-104-A[2] | PACM Polyamide | Passed | Failed | Passed | Passed |
| 146 | 0018-61-B[3] | DACH Polyamide | Passed | Failed | Failed | Passed |
| 147 | 0018-54-A[4] | BAPP Polyamide | Failed | Failed | Failed | Failed |
| 148 | 0018-51-B[5] | IPDA Polyamide | Passed | Failed | Failed | Failed |
| 149 | Surcol 836[6] | Polyacrylate | Passed | Passed | Passed | Passed |
| 150 | UCAR ™ 500XP | Proprietary vinyl polymer | Passed | Failed | Failed | Failed |
| 151 | ELVAX ® 40W | Poly(vinylacetate) | Passed | Failed | Failed | Failed |

[1]This resin is formed by reacting UNITOL ™ BKS tall oil fatty acid, 18.2 wt %, UNIDYME ™ 14 dimer acid, 65.3 wt %, sebacic acid, 2.8 wt %, hexamethylene diamine, 4.7 wt %, and ethylene diamine, 9.1 wt %.
[2]This resin is formed by reacting UNITOL ™ BKS tall oil fatty acid, 14.6 wt %, UNIDYME ™ 14 dimer acid, 58.8 wt %, and bis(aminocyclohexyl) methane, 26.6 wt %. This resin has a 95° C. softening point.
[3]This resin is formed by reacting UNITOL ™ BKS tall oil fatty acid, 18.4 wt %, UNIDYME ™ 14 dimer acid, 60.1 wt %, adipic acid, 3.5 wt %, and 1,2-diaminocyclohexane, 18.0 wt %.
[4]This resin is formed by reacting propionic acid, 5.7 wt %, UNIDYME ™ 14 dimer acid, 44.6 wt %, adipic acid, 11.3 wt %, and bis(aminopropyl) piperazine, 38.3 wt %. This resin has a 169.5° C. softening point.
[5]This resin is formed by reacting UNITOL ™ BKS tall oil fatty acid, 26.3 wt %, UNIDYME ™ 14 dimer acid, 10.6 wt %, adipic acid, 24.2 wt %, and isophorone diamine, 38.8 wt %. This resin has a 124° C. softening point.
[6]This commercial acrylate resin had a viscosity at 10% in DOWANOL ™ DPM of 23.4 cps at 25° C.

TABLE 16

FLASH POINTS OF TEST BLENDS OF MONO-TERPENES

| Example | NMP | UNITENE ™ D | TERPINOLENE ™ 90 | Flash Point (° C.) |
|---------|-----|-------------|------------------|--------------------|
| 134 | 70 | 0 | 30 | 64 |
| 135 | 50 | 0 | 50 | 64 |
| 136 | 30 | 0 | 70 | 62 |
| 137 | 80 | 20 | 0 | 64 |
| 138 | 70 | 30 | 0 | 60 |
| 139 | 60 | 40 | 0 | 58 |

EXAMPLES 140–151

Adhesion Performance of Polymerized Fatty Acid-Based Polyamide Resins

In these examples, solutions of polyamide resin are drawn on selected substrates and tested for adhesion to said substrates by using tape to assess the extent of resin release.

Selected polymerized fatty acid-based polyamide resins (typically as a 20 wt % solution in hexanol) were applied as a thin film onto selected polymeric substrates (vinyl, polyethylene (LLDPE), polypropylene (PP), or MYLAR™), and allowed to dry at least overnight. Then, strips of SCOTCH™ 600 or SCOTCH™ 610 cellophane tape were applied as strips 4–8 inches in length, across the resin-coated substrates, leaving no air pockets between tape and substrates. Tape strips were then removed by pulling at a 180° angle to the substrate, doing so with steady consistent movement. The test was then repeated in several locations throughout each coated substrate. The resin was deemed to have From the foregoing it will be appreciated that, although specific embodiments of the invention have been described herein for purposes of illustration, various modifications may be made without deviating from the spirit and scope of the invention. Accordingly, the invention is not limited except as by the appended claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method of printing, comprising charging a printhead of an inkjet printer with ink, the ink being a fluid homogeneous mixture comprising polymerized fatty acid-based polyamide resin that is the reaction product of reactants comprising polymerized fatty acid polyamide, ethylene diamine, hexamethylenediamine, and fatty acid with an organic solvent and colorant, wherein the organic solvent comprises a first solvent and a second solvent, where the first solvent comprises at least one solvent selected from solvents comprising a single amide, a single carbamide, or a single hydroxyl group as the only non-hydrocarbon moiety in the solvent; and the second solvent has a viscosity at 25° C. that is less than 60 cps and comprises at least one hydrocarbon solvent; and transferring the ink from the printhead onto a substrate.

2. The method of claim 1 wherein the printer is a drop-on-demand printer.

3. The method of claim 1 wherein the first solvent is at least 20% by weight, and the second solvent is up to 80% by weight of the organic solvent in the ink.

4. The method of claim 1 wherein the first solvent comprises at least one of N-methylpyrrolidinone, N,N-dimethylformamide, N,N-dimethylacetamide, and tetramethylurea; and the second solvent comprises at least one terpene hydrocarbon.

5. The method of claim 1 wherein the first solvent comprises at least one alcohol solvent selected from the group consisting of cyclohexanol, 1-hexanol, 2-hexanol, 3-hexanol, cis-2-hexen-1-ol, trans-2-hexen-1-ol, cycloheptanol, 1-heptanol, 2-heptanol, 2-ethyl-1-hexanol, 1-octanol, 1-nonanol, 3,5,5-trimethyl-1-hexanol, 1-decanol, α-terpineol, and 3,7-dimethyl-3-octanol; and the second solvent comprises mineral spirits or a fraction thereof.

6. The method of claim 1 wherein the organic solvent further comprises a third solvent selected from α-hydroxy-carboxylic ester, polyalkylene glycol alkyl ether, and ketone-containing solvents.

7. The method of claim 6 wherein the third solvent is selected from methyl lactate, ethyl lactate, n-propyl lactate, isopropyl lactate, diethylene glycol methyl ether, dipropylene glycol methyl ether, and cyclohexanone.

8. The method of claim 6 wherein the third solvent is up to 50% by weight of the organic solvent in the ink.

9. A printing ink composition comprising colorant, resin and solvent, where the resin is a polymerized fatty acid-based polyamide resin that is the reaction product of reactants comprising polymerized fatty acid polyamide, ethylene diamine, hexamethylenediamine, and fatty acid, the solvent comprises a first solvent and a second solvent wherein the first solvent comprises at least one solvent having a single amide group or a single carbamide group as the only non-hydrocarbon moiety in the solvent; and the second solvent has a viscosity at 25° C. that is less than 60 cps and comprises at least one hydrocarbon solvent.

10. The printing ink of claim 9 wherein the first solvent is at least 20% by weight, and the second solvent is up to 80% by weight of the organic solvent in the ink.

11. The printing ink of claim 9 wherein the components of the first solvent each have a total of 5 to 11 atoms selected from carbon, nitrogen, and oxygen.

12. The printing ink of claim 11 wherein the first solvent comprises at least one of N-methylpyrrolidinone, N,N-dimethylformamide, N,N-dimethylacetamide, and tetramethylurea.

13. The printing ink of claim 9 wherein the second solvent has a viscosity of less than 45 cps at 25° C.

14. The printing ink of claim 9 wherein the second solvent comprises at least one terpene hydrocarbon.

15. The printing ink of claim 14 wherein the second solvent comprises at least one terpene selected from the group consisting of α-pinene, β-pinene, limionene, and terpinolene.

16. The printing ink of claim 12 or 14 wherein the first solvent comprises at least one of N-methylpyrrolidinone, N,N-dimethylformanide, N,N-dimethylacetamide, and tetramethylurea; and the second solvent comprises at least one terpene hydrocarbon.

17. The printing ink of claim 12 or 14 wherein the first solvent comprises N-methylpyrrolidinone and the second solvent comprises terpinolene.

18. The printing ink of claim 9 wherein the organic solvent further comprises a third solvent selected from α-hydroxy-carboxylic ester, polyalkylene glycol alkyl ether, and ketone.

19. The printing ink of claim 18 wherein the third solvent is selected from methyl lactate, ethyl lactate, n-propyl lactate, isopropyl lactate, diethylene glycol methyl ether, dipropylene glycol methyl ether, and cyclohexanone.

20. The printing ink of claim 18 wherein the third solvent is up to 50% by weight of the organic solvent in the ink.

21. The printing ink of claim 9 wherein the resin comprises 5–40 wt % of the total weight of resin and solvent.

22. The printing ink of claim 9 wherein the solvent comprises at least 30 wt % of the total weight of resin and solvent.

23. The printing ink of claim 9 having a viscosity of less than 25 cps at one or more temperatures between 25° C. and 60° C.

24. The printing ink of claim 9 having a flash point of greater than 40° C.

25. A printing ink composition comprising colorant, resin and solvent, where the resin is a polymerized fatty acid-based polyamide resin that is the reaction product of reactants comprising polymerized fatty acid polyanilde, ethylene diamine, hexamethylenediamine, and fatty acid, the solvent comprises a first solvent and a second solvent, where the first solvent comprises at least one solvent having a single hydroxyl group as the only non-hydrocarbon moiety in the solvent; and the second solvent has a viscosity at 25° C. that is less than 60 cps and comprises at least one hydrocarbon.

26. The printing ink of claim 25 wherein the first solvent is at least 20% by weight, and the second solvent is up to 80% by weight of the organic solvent in the ink.

27. The printing ink of claim 25 wherein the components of the first solvent each have a total of 5 to 11 atoms selected from carbon and oxygen.

28. The printing ink of claim 27 wherein the first solvent comprises a hydroxyl-containing solvent selected from the group consisting of cyclohexanol, 1-hexanol, 2-hexanol, 3-hexanol, cis-2-hexen-1-ol, trans-2-hexen-1-ol, cycloheptanol, 1-heptanol, 2-heptanol, 2-ethyl-1-hexanol, 1-octanol, 1-nonanol, 3,5,5-trimethyl-l-hexanol, 1-decanol, α-terpineol, and 3,7-dimethyl-3-octanol.

29. The printing ink of claim 25 wherein the second solvent has a viscosity of less than 45 cps at 25° C.

30. The printing ink of claim 25 wherein the second solvent comprises mineral spirits or a fraction thereof.

31. The printing ink of claim 28 or 30 wherein the first solvent comprises 1-hexanol or 1-heptanol and the second solvent comprises mineral spirits.

32. The printing ink of claim 25 wherein the organic solvent further comprises a third solvent selected from α-hydroxy-carboxylic ester, polyalkylene glycol alkyl ether, and ketone.

33. The printing ink of claim 32 wherein the third solvent is selected from methyl lactate, ethyl lactate, n-propyl lactate, isopropyl lactate, diethylene glycol methyl ether, dipropylene glycol methyl ether, and cyclohexanone.

34. The printing ink of claim 32 wherein the third solvent is up to 50% by weight of the organic solvent in the ink.

35. The printing ink of claim 25 wherein the resin comprises 5–40 wt % of the total weight of resin and solvent in the ink.

36. The printing ink of claim 25 wherein the solvent comprises at least 30 wt % of the total weight of resin and solvent.

37. The printing ink of claim 25 having a viscosity of less than 25 cps at one or more temperatures between 25° C. and 60° C.

38. The printing ink of claim 25 having a flash point of greater than 40° C.

39. The printing ink according to claim 25, wherein the polymerized fatty acid-based polyamide resin has a softening point of at least 70° C.

40. The printing ink according to claim 25, wherein the polymerized fatty acid-based polyamide resin has a weight average molecular weight of from 2,000 to 10,000.

41. The method according to claim 1, wherein the second solvent has a viscosity at 25° C. that is less than 45 cps.

42. The method according to claim 1, wherein the second solvent has a viscosity at 25° C. that is less than 30 cps 43. The method according to claim 1, wherein the second solvent has a viscosity at 25° C. that is less than 25 cps.

44. The printing ink according to claim 9, wherein the second solvent has a viscosity at 25° C. that is less than 30 cps.

45. The printing ink according to claim 9, wherein the second solvent has a viscosity at 25° C. that is less than 25 cps.

46. The printing ink according to claim 25, wherein the second solvent has a viscosity at 25° C. that is less than 30 cps.

47. The printing ink according to claim 25, wherein the second solvent has a viscosity at 25° C. that is less than 25 cps.

* * * * *